United States Patent [19]
Woudwyk

[11] Patent Number: 5,865,092
[45] Date of Patent: Feb. 2, 1999

[54] ENGINE CONNECTING ROD AND DOUBLE PISTON ASSEMBLY

[76] Inventor: Anthony D. Woudwyk, 5818 E. Sternberg Rd., Fruitport, Mich. 49415

[21] Appl. No.: 20,403

[22] Filed: Feb. 9, 1998

Related U.S. Application Data

[60] Provisional application No. 60/051,669 Jul. 3, 1997.

[51] Int. Cl.⁶ ........................................................ F16C 7/00
[52] U.S. Cl. ........................ 92/216; 123/78 E; 123/78 B; 123/78 BA; 123/48 B; 92/187
[58] Field of Search ............................. 123/48 B, 78 BA, 123/78 B, 78 E; 92/216

[56] References Cited

U.S. PATENT DOCUMENTS

| | | | |
|---|---|---|---|
| 668,250 | 2/1901 | Zurawski | 123/657 |
| 1,033,760 | 7/1912 | Hutchinson | 123/78 B |
| 1,309,891 | 7/1919 | Griffith | 123/51 R |
| 1,905,062 | 4/1933 | Schaeffers . | |
| 2,368,412 | 10/1945 | Cords . | |
| 3,200,798 | 8/1965 | Mansfield . | |
| 4,137,873 | 2/1979 | Caswell, Sr. . | |
| 4,142,500 | 3/1979 | Davis . | |
| 4,203,406 | 5/1980 | Smith . | |
| 4,463,710 | 8/1984 | McWhorter . | |
| 4,979,427 | 12/1990 | Pfeffer et al. . | |
| 5,247,911 | 9/1993 | Nenicka . | |

FOREIGN PATENT DOCUMENTS 3222568  12/1983  Germany .

*Primary Examiner*—Henry C. Yuen
*Assistant Examiner*—Hai Huynh
*Attorney, Agent, or Firm*—Richard C. Litman

[57] ABSTRACT

A piston for internal combustion engines with an inner piston eccentrically disposed inside the outer piston. The outer piston is attached to a journal at the top of the connecting rod by a wrist pin in the usual manner. The inner piston is attached by a wrist pin to a carrier slidably disposed within the slot of a forked lateral projection extending from the top of the connecting rod. Outer piston movement and inner piston movement relative to the outer piston, produces variable compression and applies torque to the crankshaft while at TDC (top-dead-center).

5 Claims, 5 Drawing Sheets

5,865,092

ENGINE CONNECTING ROD AND DOUBLE PISTON ASSEMBLY

CROSS-REFERENCE TO RELATED APPLICATION

This application claims the benefit of U.S. Provisional patent application Ser. No. 60/051,669, filed Jul. 3, 1997.

BACKGROUND OF THE INVENTION

1. Field of the Invention

The present invention relates to internal combustion engines and, more particularly, to a inner piston disposed inside a bore within an outer piston, the inner piston being coupled to the connecting rod in the usual manner, and the outer piston being coupled to a carrier which is slidably mounted in the slot of a forked lateral projection at the upper end of the connecting rod.

2. Description of Related Art

The reciprocating components of most piston driven engines include, essentially, one or more of a crankshaft, a connecting rod, a wrist pin and a piston. Internal combustion engines are known to achieve higher efficiency and performance with a high compression ratio. High compression engines do have a disadvantage, however. When operated at o.t. or w.o.t, the high pressure created within the combustion chamber of the cylinder after ignition tends to cause a secondary post-ignition explosion. This condition is commonly known as engine "knock". On the other hand, low compression engines suffer far less from knock at open throttle. When throttled, however, low compression engines are less efficient than high compression engines and tend to achieve less complete combustion of fuel. It is therefore desirable to have an engine with a variable compression ratio in order to receive the benefits of both a high compression ratio and a low compression ratio.

U.S. Pat. No. 4,137,873, issued to Caswell, Sr., on Feb. 6, 1979, shows a piston providing a flexible top wall adjacent the combustion chamber which allows the head of the piston to compress downwardly toward the base of the piston in response to pressure within the combustion chamber.

U.S. Pat. No. 4,203,406, issued to Smith on May 20, 1980, shows a piston which is in two pieces, a piston skirt integral with and depending from the piston head, and a sleeve cooperating with the piston skirt. The skirt and sleeve are in a telescoping relationship and are kinematically linked to each other and to the crankshaft of the engine. The connecting rod is pivotally attached to the sleeve by a wrist pin. The connecting rod extends into the piston head and is pivotally attached to a secondary connecting rod by a second wrist pin which is in turn pivotally attached the piston skirt by a third wrist pin. In this manner, the piston head is raised to a maximum elevation at both the end of the compression stroke and the end of the expansion stroke. The piston head and skirt are lowered to a lower elevation relative to the sleeve during the balance of the work stroke.

Pistons having a variable compression ratio can also be beneficial by increasing the fuel efficiency of two-stroke engines, four-stoke cycle engines and improving the cold-start and warm-up behavior of these engines. Pistons have been designed to realize the aforementioned benefits, and are made up of an outer piston part and an inner piston part, which is pivotally attached to the connecting rod. These pistons use hydraulic fluid which is forced in and out of the space between the two piston parts to raise and lower the compression ratio within the combustion chamber.

The following teach examples of pistons having variable compression height which use hydraulic forces to raise and lower the compression ratio: U.S. Pat. No. 3,200,798, issued to Mansfield on Aug. 17, 1965, which adapts the variable piston for two-cycle engines; U.S. Pat. No. 4,979,427, issued to Pfeffer et al., on Dec. 25, 1990, which adds temperature sensitive variation of the piston; and U.S. Pat. No. 5,247,911, issued to Nenicka et al., on Sep. 28, 1993, which adds a compression ratio control system that is external to the variable piston.

Two part pistons perform functions other than the variation of the compression ratio. U.S. Pat. No. 1,905,062, issued to Schaeffers on Apr. 25, 1933, shows a two part piston having a secondary piston linked to the connecting rod. The secondary piston controls air intake in a two-stroke cycle engine thereby improving efficiency and performance.

Another performance deficiency that can be improved by using a two part piston arises during the initial portion of the combustion cycle, the power stroke, of an internal combustion engine. The relationship between the piston, connecting rod, and crankshaft at TDC (top-dead-center) does not permit the transfer of lateral forces acting on the top of the piston into torque for rotating the crankshaft. U.S. Pat. No. 2,368,412, issued to Cords on Jan. 30, 1945, shows a piston which is provided with two relatively movable parts, one part being pivoted relative to the other part, provided with a crank arm connection between this pivoted portion and the connecting rod. Four wrist pins are required to complete the linkage between the two relatively moveable parts, the link, the crank arm, and the connecting rod. During an explosion at TDC, torque for rotating the crankshaft is applied by the pivoted portion via a link to the crank arm and connecting rod. U.S. Pat. No. 4,463,710, issued to McWhorter on Aug. 7, 1984, shows another two part piston designed to apply torque for rotating the crankshaft at TDC. The connecting rod is pivotally linked to a piston slider by a wrist pin, which is slidably mounted in the internal volume of the piston head. The piston head is pivotally mounted to a carrier by a second wrist pin, which is in turn slidably mounted in an inclined slot in the connecting rod. Changes in the angularity of the connecting rod, caused by rotation of the crankshaft, result in the piston being alternately raised and lowered as the carrier slides to the right and to the left of the inclined slot.

German Patent Application Number 3,222,568, dated Dec. 22, 1983 shows a double piston assembly wherein the main piston has an inclined cylinder in top as a combustion chamber containing a small piston. The small piston is pivotally attached to a linking member by a wrist pin. The linking member is pivotally attached by a second wrist pin to a lateral projection of the connecting rod. The main piston is attached to the connecting rod by a third wrist pin in the usual manner. The design of the small piston is such that it applies torque for rotating the crankshaft when acted on at TDC.

None of the prior art variable compression two part pistons utilize the larger of the two parts to apply torque to the crankshaft at top dead center via a forked lateral projection of the connecting rod. Nor are any of the prior art pistons attached to the connecting rod via a sliding carrier member within which the wrist pin is pivotally carried. Nor do any of the prior art two part pistons have the piston wrist pins attached to the connecting rod with an offset such that both pistons do not simultaneously achieve a TDC relationship with respect to the connecting rod and crankshaft.

None of the above inventions and patents, taken either singly or in combination, is seen to describe the instant invention as claimed.

SUMMARY OF THE INVENTION

The reciprocating assembly essentially comprises an outer piston, an inner piston, a connecting rod, and a carrier. The outer piston has a supplemental cylinder bore passing from the top to the bottom. The inner piston is disposed within the supplemental cylinder bore. The connecting rod has a large journal at one end and a small piston pin journal at an opposite end. The end of the connecting rod having the small piston pin journal has a forked lateral projection forming a slot that has an upper carrier slide surface and a lower carrier slide surface.

The carrier has a piston pin journal for receiving a first wrist pin. The outer piston is pivotally connected to the carrier by a first wrist pin which passes through the piston pin journal, and force fit into a bore passing through the piston skirt of the outer piston. The carrier slidably engages the carrier slide surfaces, of the slot.

The inner piston is pivotally connected to the connecting rod by a second wrist pin. The second wrist pin passes through the small piston pin journal and force fit into a bore passing through the piston skirt of the inner piston.

A plurality of passages through the skirt of the outer piston into the supplemental cylinder bore and a plurality of passages through the skirt of the inner piston provide pathways for the transfer of lubricants. A plurality of piston ring grooves on the outer surface of the outer piston are each fit with a piston ring to perform the conventional functions of providing a compression seal and scraping oil from the main cylinder wall. A piston ring groove on the outer surface of the inner piston is fit with a piston ring to perform functions within the supplemental cylinder bore similar to those performed by the piston rings within the main cylinder bore.

Consider a 360 degree revolution of the crankshaft whereby the associated orientation of the connecting rod and the relative positions of the main and inner pistons are dictated by the rod's orientation. The connecting rod is rotatably connected to the crankshaft some distance from the axial center of the crankshaft. The lateral offset or distance from the axial center is essential to converting lateral motion to angular rotation. However, at TDC the lateral projection of the crankshaft is parallel to the direction of lateral motion of the pistons thus prohibiting any such conversion. Compression within the main cylinder bore is at a maximum just before the compressed fuel-air mixture is ignited during the power stroke. The initial downward force is applied to the top of the pistons immediately after ignition and is applied to the surface area of both the top of the outer piston and the top of the inner piston. The top of the outer piston has approximately two-thirds more surface area than the top of the inner piston therefor the majority of the downward force is applied to the outer piston. The force is subsequently conveyed via the first wrist pin to the carrier. The carrier transfers this force to the lower carrier slide surface of the forked end of the connecting rod. The force applied to the lateral projection of the connecting rod, upon which the lower carrier slide surface rests, is converted to a lateral force at the lower end of the connecting rod as the connecting rod pivots around the second wrist pin. This lateral force at the lower end of the connecting rod applies torque to the crankshaft. As the crankshaft turns the angular relationship between the connecting rod and the crankshaft moves from parallel to perpendicular. When perpendicular to the crankshaft projection, force applied by the connecting rod is tangential to the angular rotation of the crankshaft permitting complete conversion.

Although, mechanical advantage is greatest when the connecting rod is perpendicular to the crankshaft projection, the expanding gases which apply force to the top of the pistons have already expanded considerably, thereby applying less force to the top of the pistons. The inner piston stays raised above the outer piston during the power stroke thereby maintaining higher compression during the expansion than a standard piston. The inner piston moves into alignment with the outer piston at the end of the stroke after the expanding gases have performed the majority of their work and the additional reduction in compression has the least effect.

During a compression stroke the inner piston trails the outer piston thereby reducing the initial resistance of compression. The inner piston comes into alignment with the outer piston at the end of the compression stroke, thus enabling the last portion of the compression to be performed by the smaller surface area of the inner piston. Having the last bit of compression done, it being only that compression done by the smaller inner piston, results in less work being performed just prior to turning over TDC than would be required of a standard piston. The positional relationship between the axial center of the outer piston and axial center of the inner piston may vary from coincidence to high eccentricity depending on the desired engine performance characteristics.

Accordingly, it is a principal object of the invention to provide a reciprocating assembly which varies the compression ratio within the cylinder in order to receive the benefits associated with both a high compression ratio and a low compression ratio and to reduce compression and expansion during critical portions of the combustion cycle.

It is another object of the invention to provide a reciprocating assembly wherein the relationship between the piston, connecting rod, and crankshaft at TDC enables the transfer of lateral forces acting on the top of the piston into torque for rotating the crankshaft.

It is a further object of the invention to provide a reciprocating assembly which can be used with existing engines without any further modifications thereof.

Still another object of the invention is to provide a reciprocating assembly wherein the positional relationship between the axial center of the outer piston and axial center of the inner piston of the reciprocating assembly may vary from coincidence to high eccentricity depending on the desired engine performance characteristics.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
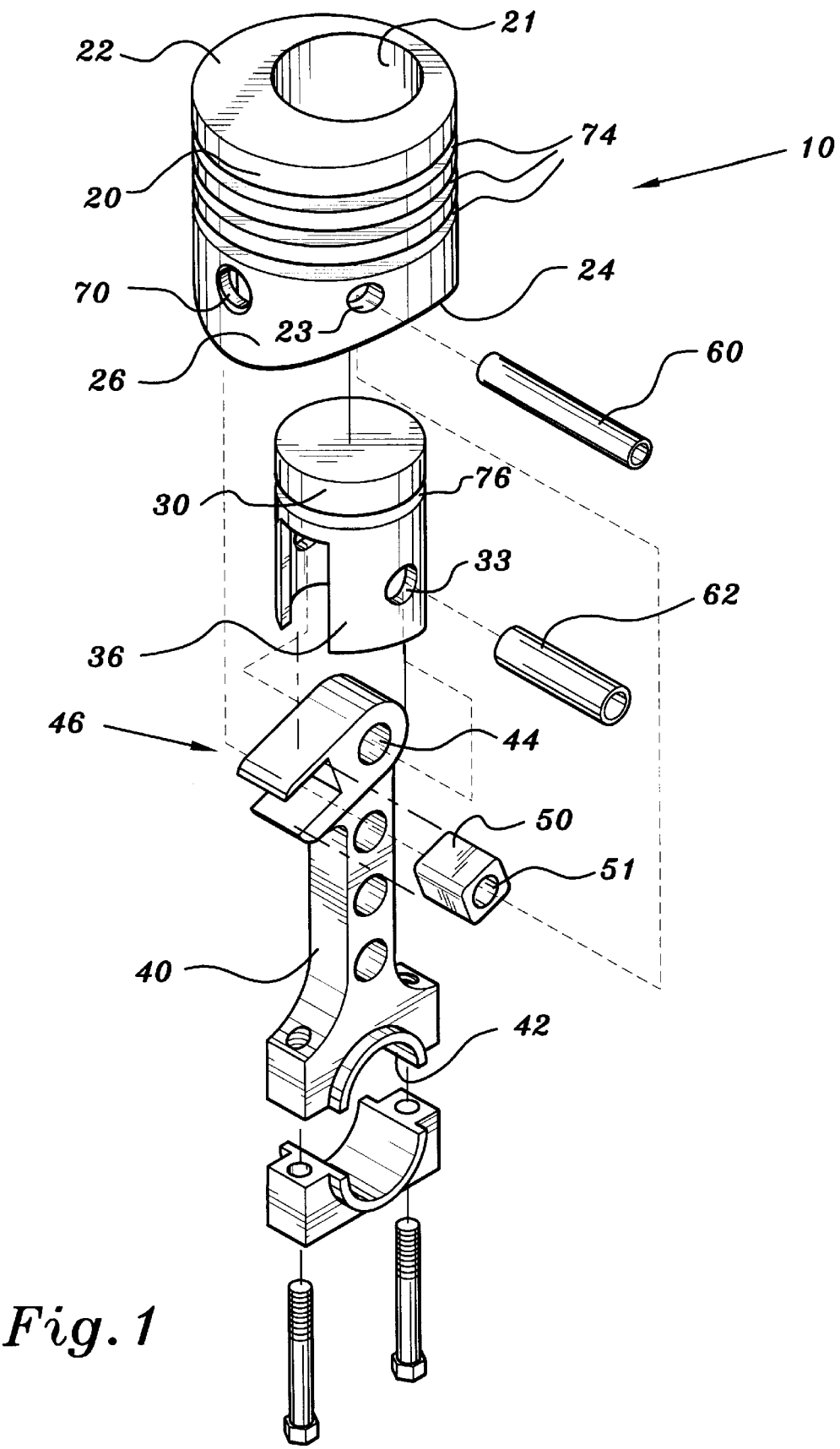
FIG. 1 is an exploded, perspective view of a connecting rod and double piston assembly according to the present invention.

Referring to the figures by numerals of reference, and first to FIG. 1, a reciprocating assembly generally designated by the reference numeral 10 will be described. The reciprocating assembly 10 is made up of an outer piston 20, an inner piston 30, a connecting rod 40, and a carrier 50. The outer piston 20 has a supplemental cylinder bore 21 passing from the top 22 to the bottom 24. The inner piston 30 is disposed within the supplemental cylinder bore 21. The connecting rod 40 has a large journal 42 at one end and a small piston pin journal 44 at an opposite end. The end of the connecting rod 40 having the small piston pin journal 44 has a forked lateral projection 46 forming a slot that has an upper carrier slide surface 54 and a lower carrier slide surface 52 (see FIG. 2).

The carrier 50 has a piston pin journal 51 for receiving a first wrist pin 60. The outer piston 20 is pivotally connected to the carrier 50 by the first wrist pin 60 which passes through the carrier piston pin journal 51, and is force fit into a bore 23 passing through the piston skirt 26 of the outer piston 20. The carrier 50 slidably engages the carrier slide surfaces 52, 54 of the slot formed at 46.

The inner piston 30 is pivotally connected to the connecting rod 40 by a second wrist pin 62, which passes through the small piston pin journal 44 and is force fit into a bore 33 passing through the piston skirt 36 of the inner piston.

Figure 2:
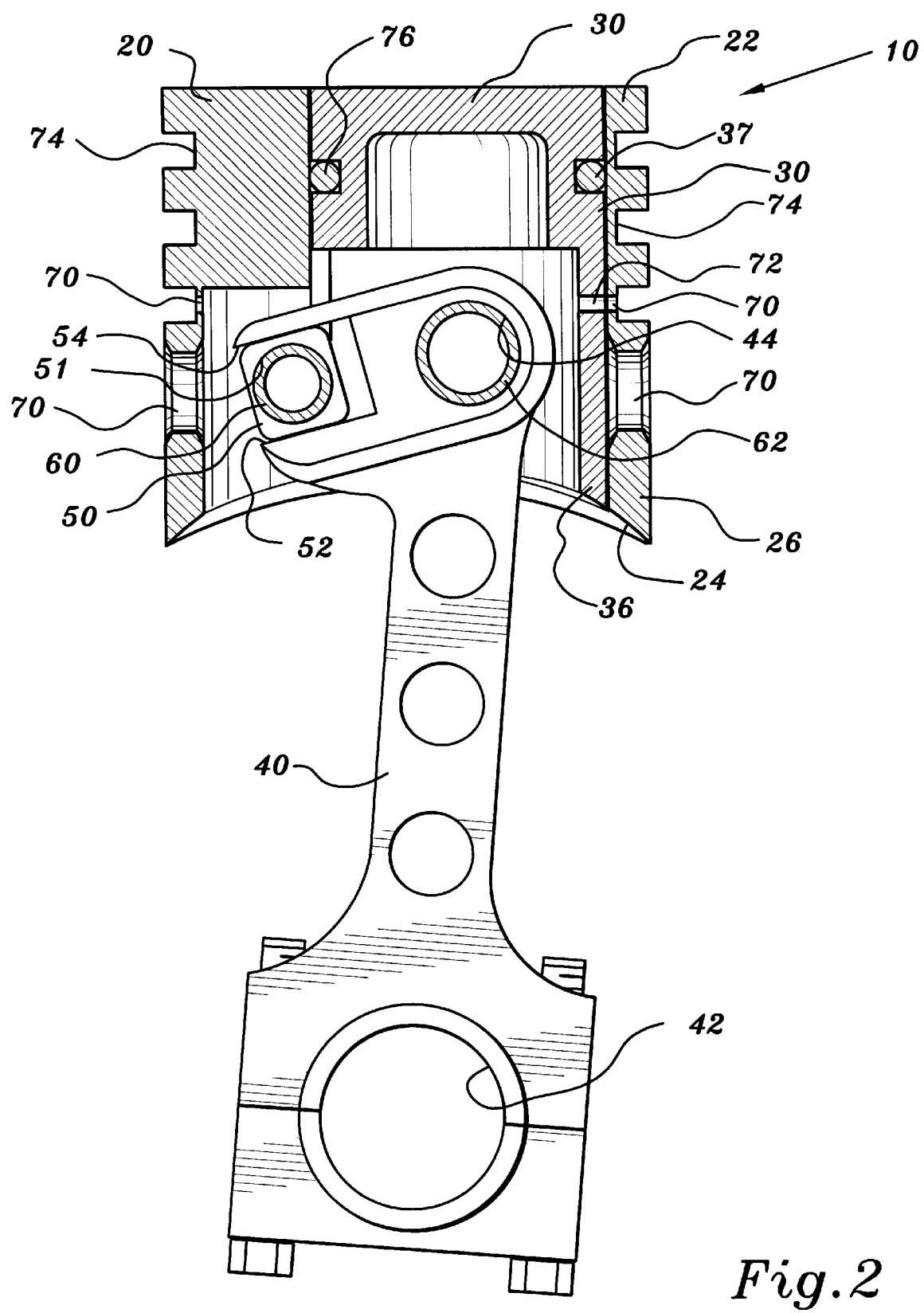
FIG. 2 is a front, elevational view of the connecting rod and double piston assembly as seen in FIG. 1, drawn to an enlarged scale, and with the piston shown in cross section.

Referring to FIG. 2, a plurality of passages 70 through the skirt 26 of the outer piston 20 into the supplemental cylinder bore 21 and a plurality of passages 72 through the skirt 36 of the inner piston 30 provide pathways for the transfer of lubricants. A plurality of piston ring grooves 74 on the outer surface of the outer piston 20 are each fit with a piston ring (not shown) to perform the conventional functions of providing a compression seal and scraping oil from the main cylinder wall 80. A piston ring groove 76 on the outer surface of the inner piston 30 is fit with a piston ring 37 to perform functions within the supplemental cylinder bore 21, similar to those performed by the piston rings within the main cylinder bore 81.

Referring now to FIGS. 3–6, a 360 degree revolution of the crankshaft 100 is shown in 90 degree increments, thereby illustrating the associated orientation of the connecting rod 40 and the relative positions of the main 20 and inner 30 pistons as dictated by the orientation of the rod.

Figure 3:
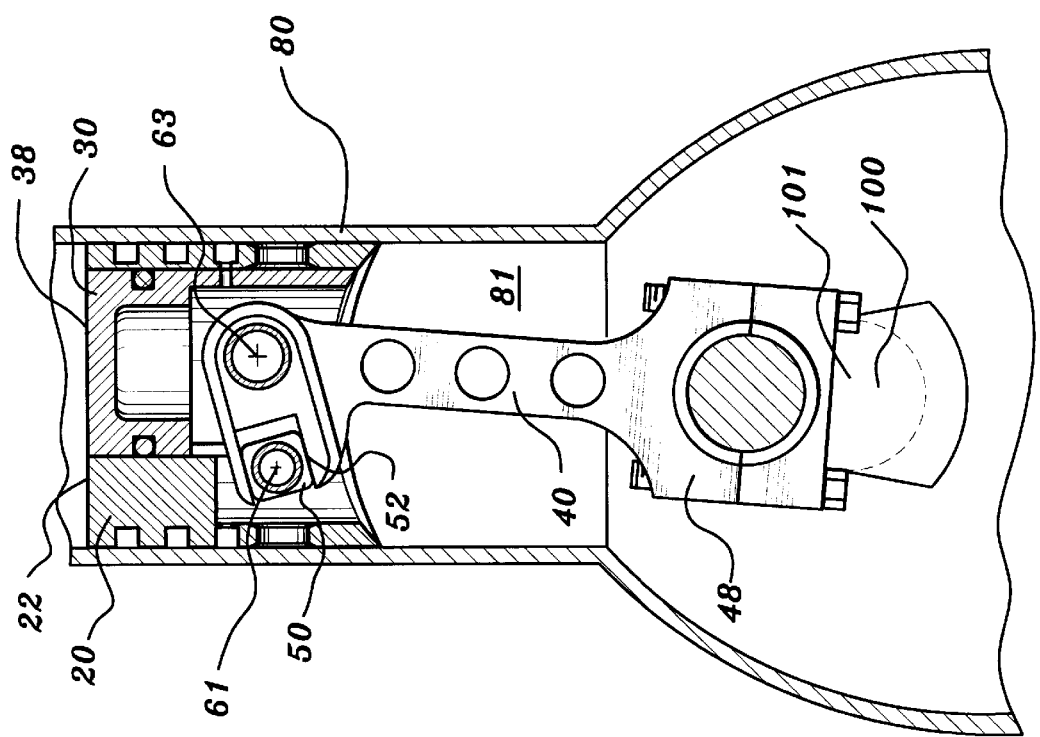
FIG. 3 is a front, elevational view of the reciprocating assembly at TDC, as mounted in a diagrammatic illustration of the surrounding engine shown in cross section.

Referring first to FIG. 3, the crankshaft 100 is positioned at zero or 360 degrees or TDC. The orientation of the connecting rod 40 is such that the axial center 61 of the first wrist pin 60 and the axial center 63 of the second wrist pin 62 lie in a plane having a slightly positive slope. The top 22 of the outer piston 20 and the top 38 of the inner piston 30 lie in a horizontal plane at the maximum level to which either piston 20, 30 travels. The connecting rod is rotatably connected to the crankshaft 100 some distance from the axial center 101 of the crankshaft 100. The lateral offset is essential to converting lateral motion to angular rotation. At TDC, however, the lateral projection of the crankshaft 100 is parallel to direction of lateral motion of the pistons 20, 30, thus prohibiting any such conversion.

Compression within the main cylinder bore 81 is at a maximum just before the compressed fuel-air mixture is ignited during the power stroke. The initial and maximum downward force is applied to the pistons 20, 30 immediately after ignition and is applied to the surface area of both the top 22 of the outer piston 20 and the top 38 of the inner piston 30. The top 22 of the outer piston has approximately two-thirds more surface area than the top 38 of the inner piston; the majority of the downward force, therefore, is applied to the outer piston 20.

The force is subsequently conveyed via the first wrist pin 60 to the carrier 50. The carrier 50 transfers this force to the lower carrier slide surface 52 of the forked end 46 of the connecting rod 40. The force applied to the lateral projection of the connecting rod, upon which the lower carrier slide surface 52 rests, is converted to a lateral force at the lower end 48 of the connecting rod 40 as the connecting rod 40 pivots around the second wrist pin 62. This lateral force at the lower end 48 of the connecting rod 40 applies torque to the lateral offset of the crankshaft 100. As the crankshaft 100 turns, the angular relationship between the connecting rod 40 and the lateral offset of the crankshaft 100 moves from parallel to perpendicular.

Figure 4:
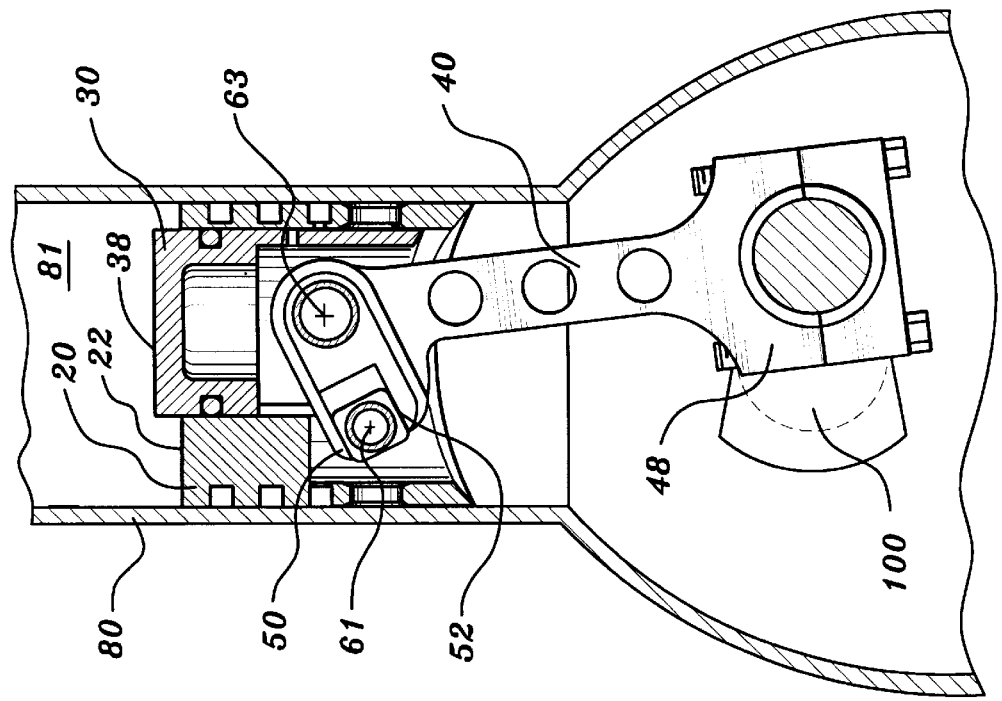
FIG. 4 is a view similar to FIG. 3, but showing the positional relationships of the various components within the engine when the crankshaft is at the 90 degree position of rotation.

Referring to FIG. 4, the crankshaft 100 is positioned at 90 degrees. The orientation of the connecting rod 40 is such that the axial center 61 of the first wrist pin 60 and the axial center 63 of the second wrist pin 62 lie in a plane having a largely positive slope. The top 22 of the outer piston 20 lies in a horizontal plane below the horizontal plane upon which the top 38 of the inner piston 30 lies. When perpendicular to the lateral projection of the crankshaft 100, force applied by the connecting rod 40 is tangential to the angular rotation of the crankshaft 100 permitting complete conversion. Although mechanical advantage is greatest when the connecting rod 40 is perpendicular to lateral projection of the crankshaft 100, the expanding gases which apply force to the tops 22, 38 of the pistons 20, 30 have already expanded considerably, thereby applying less force thereto. The inner piston 30 stays raised above the outer piston 20 during the power stroke thereby maintaining greater compression during the expansion than would be achieved by a single piston. The inner piston 30 moves into alignment with the outer piston 20 at the end of the power stroke after the expanding gases have performed the majority of their work, thereby minimizing the adverse effects of the additional reduction in compression.

Figure 5:
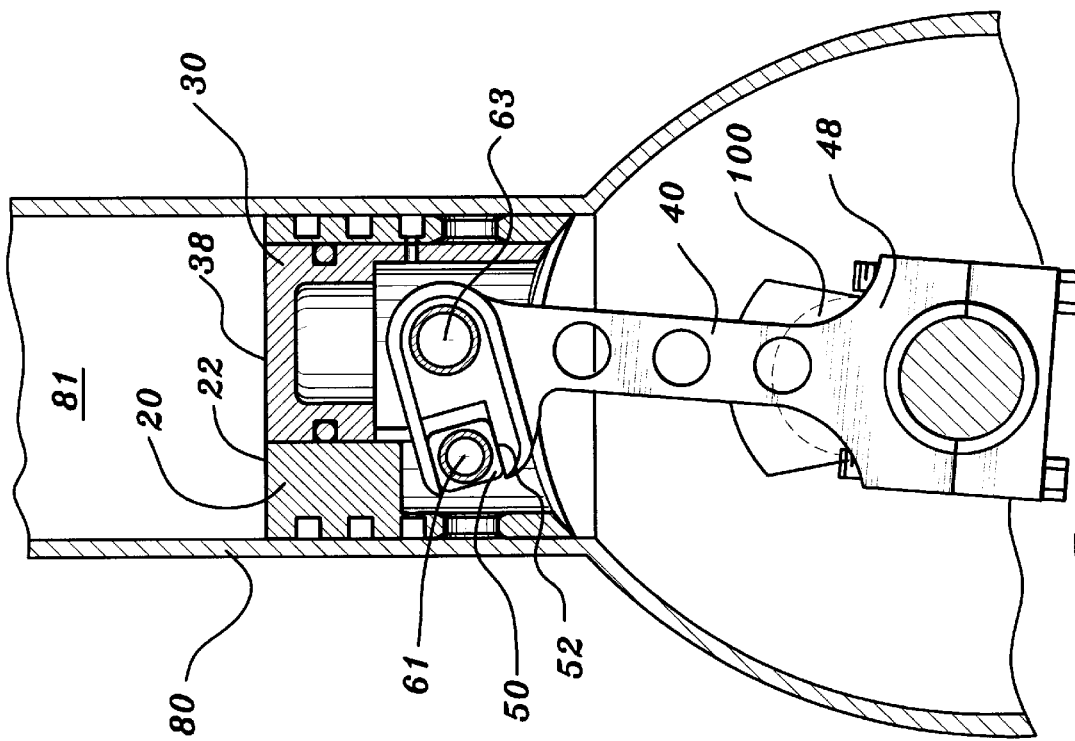
FIG. 5 is a view similar to FIG. 3, but showing the positional relationships of components when the crankshaft is at BDC (bottom-dead-center).

Referring to FIG. 5, the crankshaft 100 is positioned at 180 degrees, or BDC (bottom-dead-center). The orientation of the connecting rod 40 is such that the axial center 61 of the first wrist pin 60 and the axial center 63 of the second wrist pin 62 lie in a plane having a slightly positive slope. The tops 22, 38 of both pistons 20, 30 lie in a horizontal plane at the minimum level to which either piston travels resulting in the corresponding minimum compression. During a compression stroke the inner piston 30 trails the outer piston 20 thereby reducing the initial degree of compression.

Figure 6:
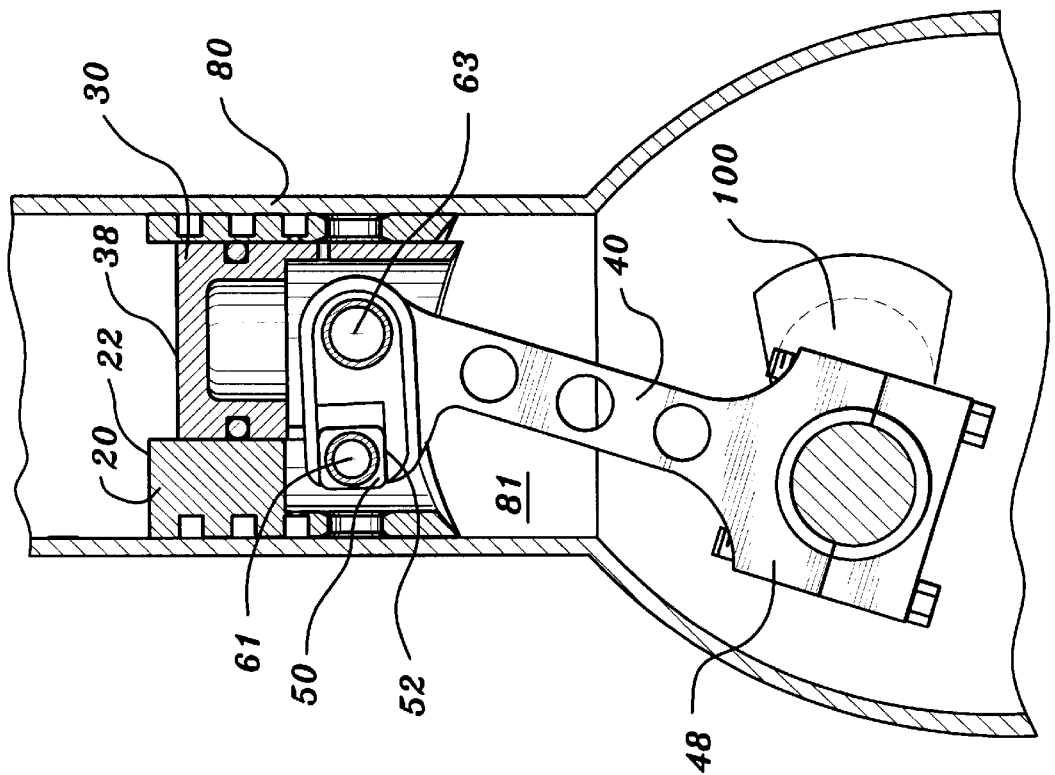
FIG. 6 is a view similar to FIG. 3 but showing the reciprocating components at the 270 degree position of the crankshaft.

Referring to FIG. 6, the crankshaft 100 is positioned at 270 degrees. The orientation of the connecting rod 40 is such that the axial center 61 of the first wrist pin 60 and the axial center 63 of the second wrist pin 62 lie in a plane having a slightly negative slope. The top 22 of the outer piston 20 lies in a horizontal plane above the horizontal plane upon which the top 38 of the inner piston 30 lies. The inner piston 30 comes into alignment with the outer piston 20 at the end of the compression stroke thus enabling the last portion of the compression to be performed by the smaller surface area of the inner piston 30 thereby necessitating less work to be performed just prior to turning over top-dead center than needed by a standard piston.

Figure 7:
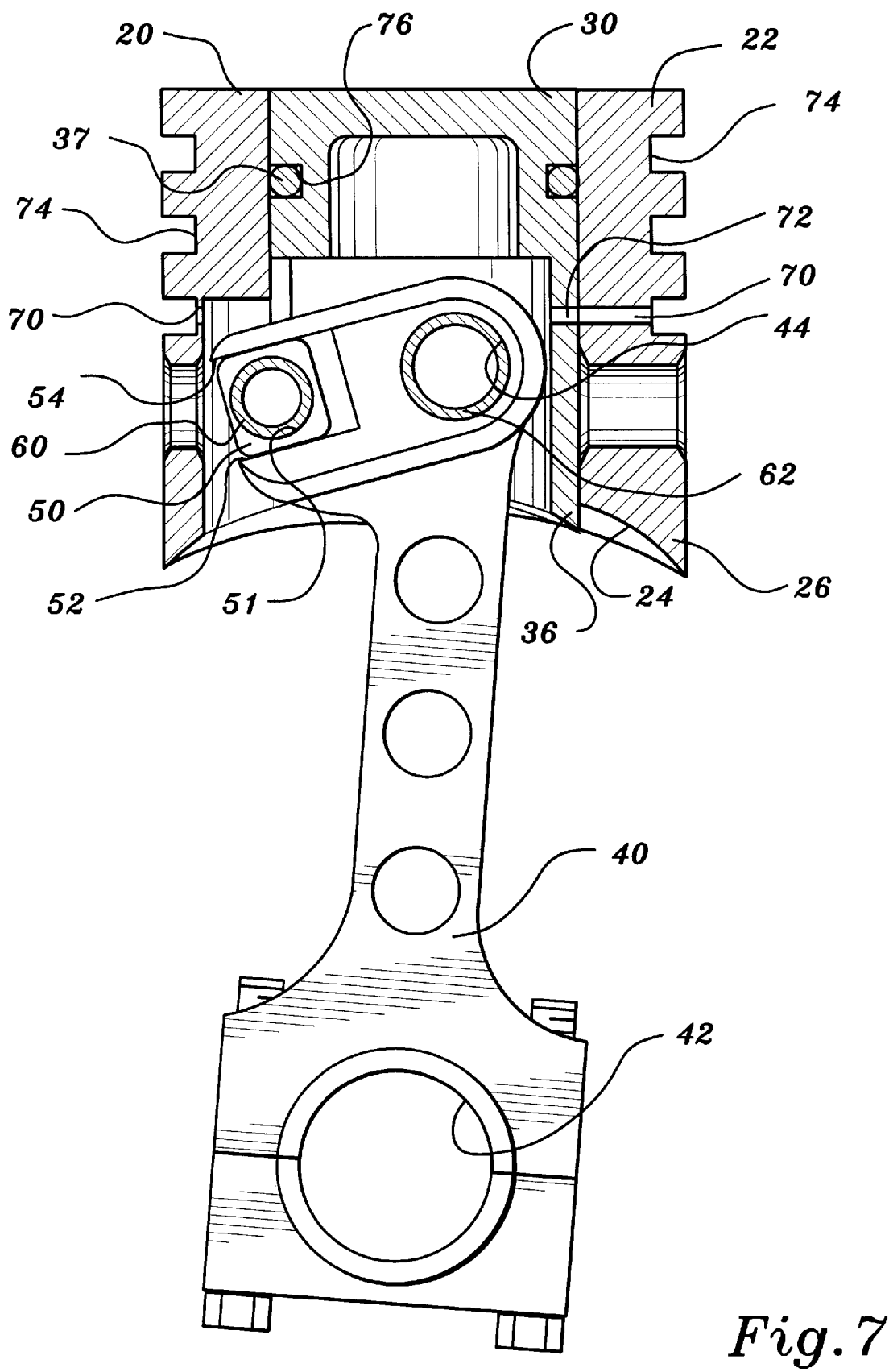
FIG. 7 is a front, elevational view of an alternate embodiment of the connecting rod and double piston assembly with the piston shown in cross section, wherein the positional relationship between the axial center of the outer piston and axial center of the inner pistons is coincident.

Referring to FIG. 2 and 7, the positional relationship between the axial center of the outer piston 20 and axial center of the inner pistons 30 may vary from coincidence to high eccentricity depending on the desired engine performance characteristics.

It is to be understood that the present invention is not limited to the embodiments described above, but encompasses any and all embodiments within the scope of the following claims.

I claim:

1. A reciprocating assembly comprising an outer piston, an inner piston, a carrier, and a connecting rod;

said outer piston having a supplemental cylinder bore passing from the top of said outer piston to the bottom of said outer piston;

said inner piston disposed in said supplemental cylinder bore;

a first wrist pin;

said carrier having a journal for receiving said wrist pin;

said connecting rod having a large journal at one end and a small journal at an opposite end, said opposite end having a forked lateral projection forming a slot;

said slot having at least two carrier slide surfaces;

said outer piston being pivotally connected to said carrier by said first wrist pin wherein said carrier slidably engages said carrier slide surfaces of said slot; and said inner piston being pivotally connected to said connecting rod by a second wrist pin attached to said small journal.

2. The reciprocating assembly according to claim 1, including a means for the transfer of lubricants comprising a plurality of passages defined through the skirt of said outer piston into the supplemental cylinder bore and a plurality of passages defined through the skirt of said inner piston.

3. The reciprocating assembly according to claim 1, further including a sealing means made up of a plurality of rings on the outer surface of the outer piston, and at least one ring on the outer surface of the inner piston.

4. The reciprocating assembly according to claim 1, wherein the center of the top of the outer piston and center of the top of the inner pistons are dimensioned and configured to be coincident in positional relationship.

5. The reciprocating assembly according to claim 1, wherein the center of the top of the outer piston and center of the top of the inner pistons is dimensioned and configured to be eccentric in positional relationship.

* * * * *